US010782992B2

(12) United States Patent
Cui et al.

(10) Patent No.: US 10,782,992 B2
(45) Date of Patent: Sep. 22, 2020

(54) HYPERVISOR CONVERSION

(71) Applicant: Nutanix, Inc., San Jose, CA (US)

(72) Inventors: Miao Cui, New York, NY (US); Aroosh Sohi, Campbell, CA (US); Srinivas Bandi Ramesh Babu, Mountain View, CA (US); Jaspal Singh Dhillon, Bengaluru (IN); Gaurav Poothia, Redmond, WA (US); Pulkit Yadav, Bangalore (IN); Supreeth Srinivasan, Bangalore (IN)

(73) Assignee: Nutanix, Inc., San Jose, CA (US)

( * ) Notice: Subject to any disclaimer, the term of this patent is extended or adjusted under 35 U.S.C. 154(b) by 255 days.

(21) Appl. No.: 15/340,871

(22) Filed: Nov. 1, 2016

(65) Prior Publication Data
US 2018/0121223 A1    May 3, 2018

(51) Int. Cl.
   *G06F 9/455* (2018.01)
(52) U.S. Cl.
   CPC .. *G06F 9/45558* (2013.01); *G06F 2009/4557* (2013.01)
(58) Field of Classification Search
   CPC ................ G06F 9/45558; G06F 2009/4557
   See application file for complete search history.

(56) References Cited

U.S. PATENT DOCUMENTS

| 7,814,495 B1 * | 10/2010 | Lim ................... G06F 9/45558 |
| | | 718/104 |
| 8,196,138 B2 * | 6/2012 | Allwell ................... G06F 9/461 |
| | | 718/1 |
| 8,352,608 B1 * | 1/2013 | Keagy ....................... G06F 8/63 |
| | | 709/226 |
| 8,549,518 B1 | 10/2013 | Aron et al. |
| 8,601,473 B1 | 12/2013 | Aron et al. |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Jung W Kim
*Assistant Examiner* — Bruce S Ashley
(74) *Attorney, Agent, or Firm* — Dorsey & Whitney LLP (57) ABSTRACT

In one embodiment, a system for managing communication connections in a virtualization environment includes (1) a first host machine implementing a virtualization environment based on a first platform, wherein the first host machine includes a first hypervisor, at least one virtual machine, and one or more virtual infrastructure elements and (2) a virtual disk including a plurality of storage devices. A management module for the system may perform steps to convert the first host machine to a second platform by installing (on the first host machine) a second hypervisor associated with the second platform, disabling the first hypervisor, capturing a configuration describing elements of a virtual infrastructure associated with the first hypervisor, registering the captured configuration with the second hypervisor, creating elements of the captured configuration in the context of the second platform and in association with the second hypervisor, and then enabling the second hypervisor.

27 Claims, 8 Drawing Sheets

(56) References Cited

U.S. PATENT DOCUMENTS

| | | | |
|---|---|---|---|
| 8,850,130 B1 | 9/2014 | Aron et al. | |
| 8,909,912 B2* | 12/2014 | French | G06F 9/4418 713/2 |
| 9,772,866 B1 | 9/2017 | Aron et al. | |
| 2006/0075199 A1* | 4/2006 | Kallahalla | G06F 3/0608 711/153 |
| 2009/0300605 A1* | 12/2009 | Edwards | G06F 9/45558 718/1 |
| 2012/0179932 A1* | 7/2012 | Armstrong | G06F 11/20 714/4.11 |
| 2016/0147556 A1* | 5/2016 | Hu | G06F 9/45558 718/1 |
| 2016/0306648 A1* | 10/2016 | Deguillard | G06F 9/45558 |
| 2016/0306649 A1* | 10/2016 | Gunti | G06F 9/45558 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/ ; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

* cited by examiner

HYPERVISOR CONVERSION

TECHNICAL FIELD

This disclosure generally relates to hypervisor conversion within a virtualization environment.

BACKGROUND

"A virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines running virtualization environments, to not only utilize the processing power of the physical devices to aggregate the storage of the individual physical devices, but to create a logical storage pool wherein the data may be distributed across the physical devices so that the aggregate storage appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

SUMMARY OF PARTICULAR EMBODIMENTS

Embodiments of the present invention provide an architecture for implementing conversion of hypervisors of a virtualization environment while preserving constituent VMs. According to some embodiments, a management module is employed to control the conversion of hypervisors. Through the management module, an administrator of the virtualization environment may install and enable a new hypervisor to take the place of a pre-existing hypervisor implemented on a physical host machine, which may be part of a clustered system. The conversion of hypervisors according to particular embodiments may be accomplished without disturbing the operation or modifying any characteristics of VMs managed by the original hypervisor.

In particular embodiments, it may be desirable to convert an original virtualization environment implemented on a physical host machine to a new virtualization environment. The original and new virtualization environments may be based on different platforms or created by different virtualization vendors. The conversion of virtualization environments may require converting an original hypervisor implemented on the physical host machine to a new hypervisor. An administrator of the virtualization environment may convert the hypervisors through a management module, which may be deployed as an agent. In some embodiments, the management module may first install the new hypervisor on the physical host machine while the original hypervisor is running to manage one or more VMs. The management module may then capture a configuration comprising information describing various elements of a virtual infrastructure associated with the original hypervisor. In the meantime, one or more user VMs managed by the original hypervisor may continue running and communicating with a storage pool through a Controller/Service VM implemented on the physical host machine. The management module may then register the captured configuration with the newly installed hypervisor and recreate the elements of the virtual infrastructure in association with the new hypervisor. This prepares the new hypervisor for the management of the VMs that was managed by the original hypervisor. The new hypervisor may later be enabled to manage the VMs.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Embodiments of the present invention provide an architecture for implementing conversion of hypervisors of a virtualization environment while preserving constituent VMs. According to some embodiments, a management module is employed to control the conversion of hypervisors. Through the management module, an administrator of the virtualization environment may install and enable hypervisor to take the place of a pre-existing hypervisor implemented on a physical host machine, which may be part of a clustered system. The conversion of hypervisors according to particular embodiments may be accomplished without disturbing the operation of VMs managed by the original hypervisor.

In particular embodiments, it may be desirable to convert an original virtualization environment implemented on a physical host machine to a new virtualization environment. The original and new virtualization environments may be based on different platforms or created by different virtualization vendors. The conversion of virtualization environments may require converting an original hypervisor implemented on the physical host machine to a new hypervisor. An administrator of the virtualization environment may convert the hypervisors through a management module, which may be deployed as an agent. In some embodiments, the management module may first install the new hypervisor on the physical host machine while the original hypervisor is running to manage one or more VMs. The management module may then capture a configuration comprising information describing various elements of a virtual infrastructure associated with the original hypervisor. In the meantime, one or more user VMs managed by the original hypervisor may continue running and communicating with a storage pool through a Controller/Service VM implemented on the physical host machine. The management module may then register the captured configuration with the newly installed hypervisor and recreate the elements of the virtual infrastructure in association with the new hypervisor. This prepares the new hypervisor for the management of the VMs that was managed by the original hypervisor. The new hypervisor may later be enabled to manage the VMs.

Figure 1A:
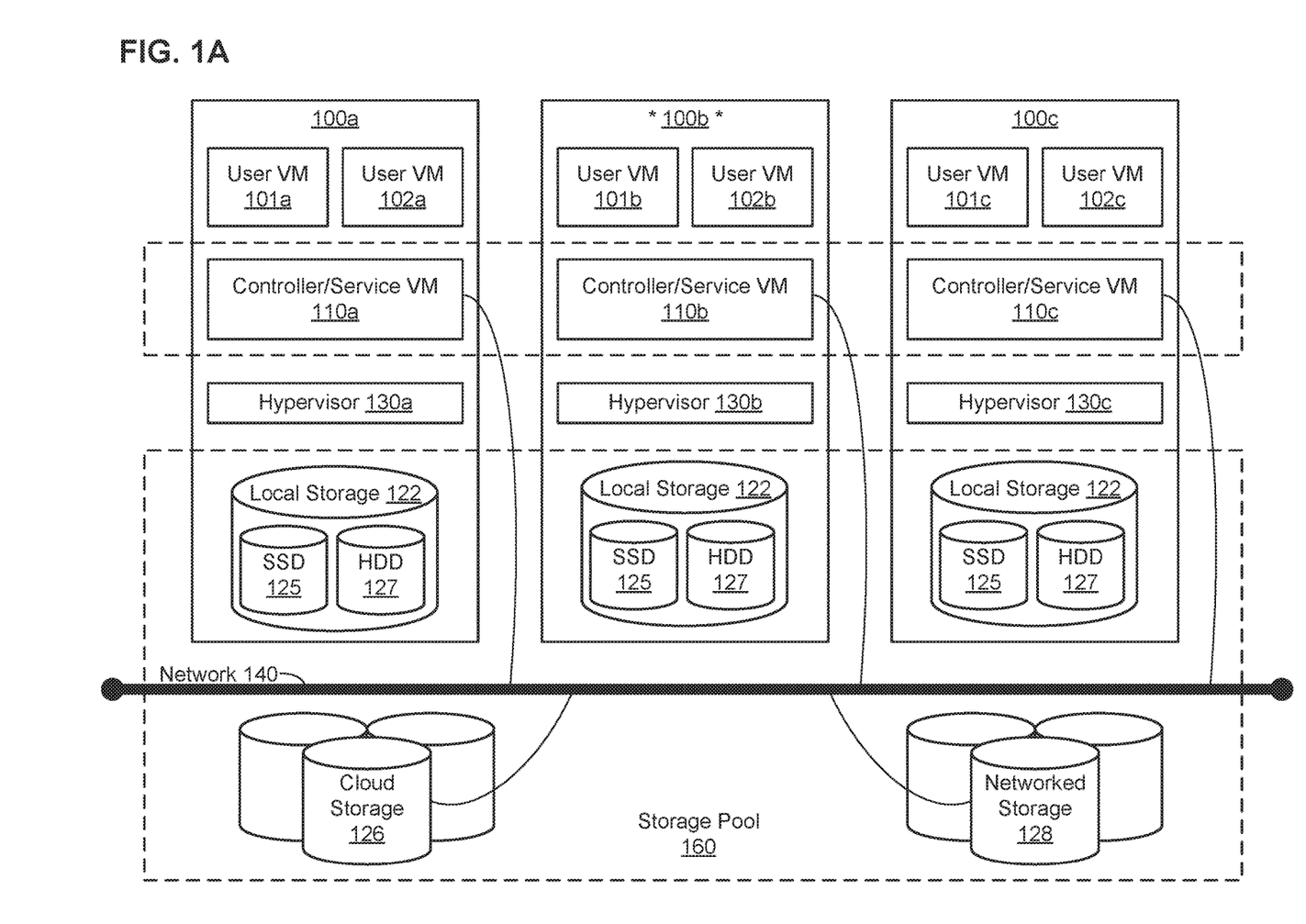
FIG. 1A illustrates a clustered virtualization environment according to some embodiments of the invention.

FIG. 1A illustrates a clustered virtualization environment according to some embodiments of the invention. The architecture of FIG. 1A can be implemented for a distributed platform that contains multiple hardware nodes 100a-c that manage multiple tiers of storage. The multiple tiers of storage may include network-attached storage (NAS) that is accessible through network 140, such as, by way of example and not limitation, cloud storage 126, which may be accessible through the Internet, or local network-accessible storage 128 (e.g., a storage area network (SAN)). Unlike the prior art, the present embodiment also permits local storage 122 that is within or directly attached to the server and/or appliance to be managed as part of storage pool 160. Examples of such storage include Solid State Drives (henceforth "SSDs") 125, Hard Disk Drives (henceforth "HDDs" or "spindle drives") 127, optical disk drives, external drives (e.g., a storage device connected to a hardware node via a native drive interface or a direct attach serial interface), or any other directly attached storage. These collected storage devices, both local and networked, form storage pool 160. Virtual disks (or "vDisks") can be structured from the storage devices in storage pool 160, as described in more detail below. As used herein, the term vDisk refers to the storage abstraction that is exposed by a Controller/Service VM to be used by a user VM. In some embodiments, the vDisk is exposed via iSCSI ("interne small computer system interface") or NFS ("network file system") and is mounted as a virtual disk on the user VM.

Each hardware node 100a-c runs virtualization software, such as VMWARE ESX(I), MICROSOFT HYPER-V, or REDHAT KVM. The virtualization software includes hypervisor 130a-c to manage the interactions between the underlying hardware and the one or more user VMs 101a, 102a, 101b, 102b, 101c, and 102c that run client software. Though not depicted in FIG. 1A, a hypervisor may connect to network 140.

Special VMs 110a-c are used to manage storage and input/output ("I/O") activities according to some embodiment of the invention, which are referred to herein as "Controller/Service VMs". These special VMs act as the storage controller in the currently described architecture. Multiple such storage controllers coordinate within a cluster to form a single-system. Controller/Service VMs 110a-c are not formed as part of specific implementations of hypervisors 130a-c. Instead, the Controller/Service VMs run as virtual machines on the various hardware nodes 100, and work together to form a distributed system 110 that manages all the storage resources, including local storage 122, networked storage 128, and cloud storage 126. The Controller/Service VMs may connect to network 140 directly, or via a hypervisor. Since the Controller/Service VMs run independent of hypervisors 130a-c, this means that the current approach can be used and implemented within any virtual machine architecture, since the Controller/Service VMs of embodiments of the invention can be used in conjunction with any hypervisor from any virtualization vendor.

A hardware node may be designated as a leader node. For example, hardware node 100b, as indicated by the asterisks, may be a leader node. A leader node may have a software component designated as a leader. For example, a software component of Controller/Service VM 110b may be designated as a leader. A leader may be responsible for monitoring or handling requests from other hardware nodes or software components on other hardware nodes throughout the virtualized environment. If a leader fails, a new leader may be designated. In particular embodiments, a management module (e.g., in the form of an agent) may be running on the leader node.

Each Controller/Service VM 110a-c exports one or more block devices or NFS server targets that appear as disks to user VMs 101a-c and 102a-c. These disks are virtual, since they are implemented by the software running inside Controller/Service VMs 110a-c. Thus, to user VMs 101a-c and 102a-c, Controller/Service VMs 110a-c appear to be exporting a clustered storage appliance that contains some disks. All user data (including the operating system) in the user VMs 101a-c and 102a-c reside on these virtual disks.

Figure 1B:
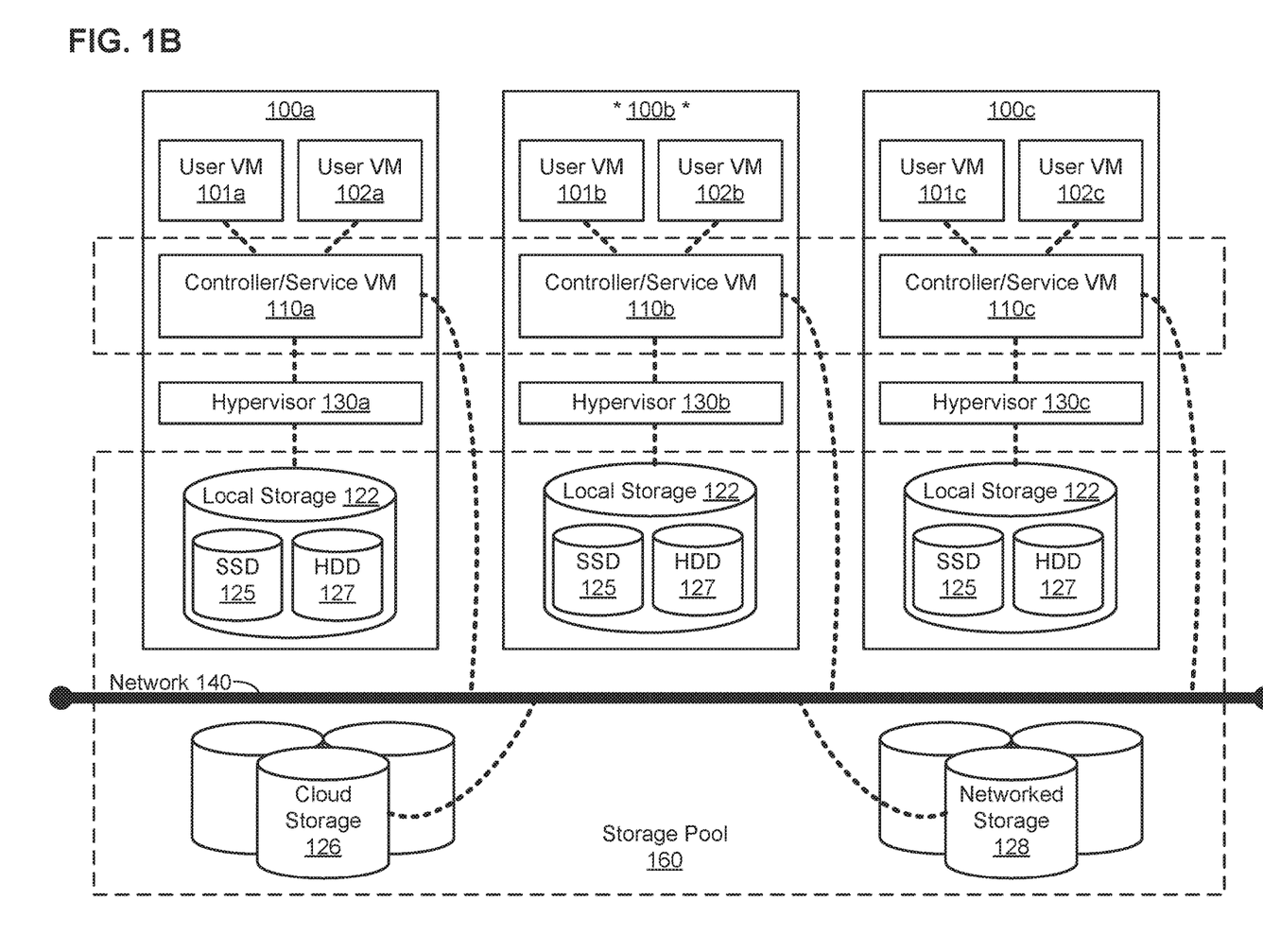
FIG. 1B illustrates data flow within a clustered virtualization environment according to some embodiments of the invention.

Significant performance advantages can be gained by allowing the virtualization system to access and utilize local storage 122 as disclosed herein. This is because I/O performance is typically much faster when performing access to local storage 122 as compared to performing access to networked storage 128 across a network 140. This faster performance for locally attached storage 124 can be increased even further by using certain types of optimized local storage devices, such as SSDs. Further details regarding methods and mechanisms for implementing the virtualization environment illustrated in FIGS. 1A and 1B are described in U.S. Pat. No. 8,601,473, which is hereby incorporated by reference in its entirety.

FIG. 1B illustrates data flow within an example clustered virtualization environment according to some embodiments of the invention. As described above, one or more user VMs and a Controller/Service VM may run on each hardware node 100 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, Controller/Service VM 110a-c may present an emulated storage controller either to the hypervisor or to user VMs to facilitate I/O operations. Controller/Service 110a-c may be connected to storage within storage pool 160. Controller/Service VM 110a may have the ability to perform I/O operations using local storage 122 within the same hardware node 100a, by connecting via network 140 to cloud storage 126 or networked storage 128, or by connecting via network 140 to local storage 122 of another node 100b-c (e.g., via connecting to another Controller/Service VM 110b-c).

Figure 2A:
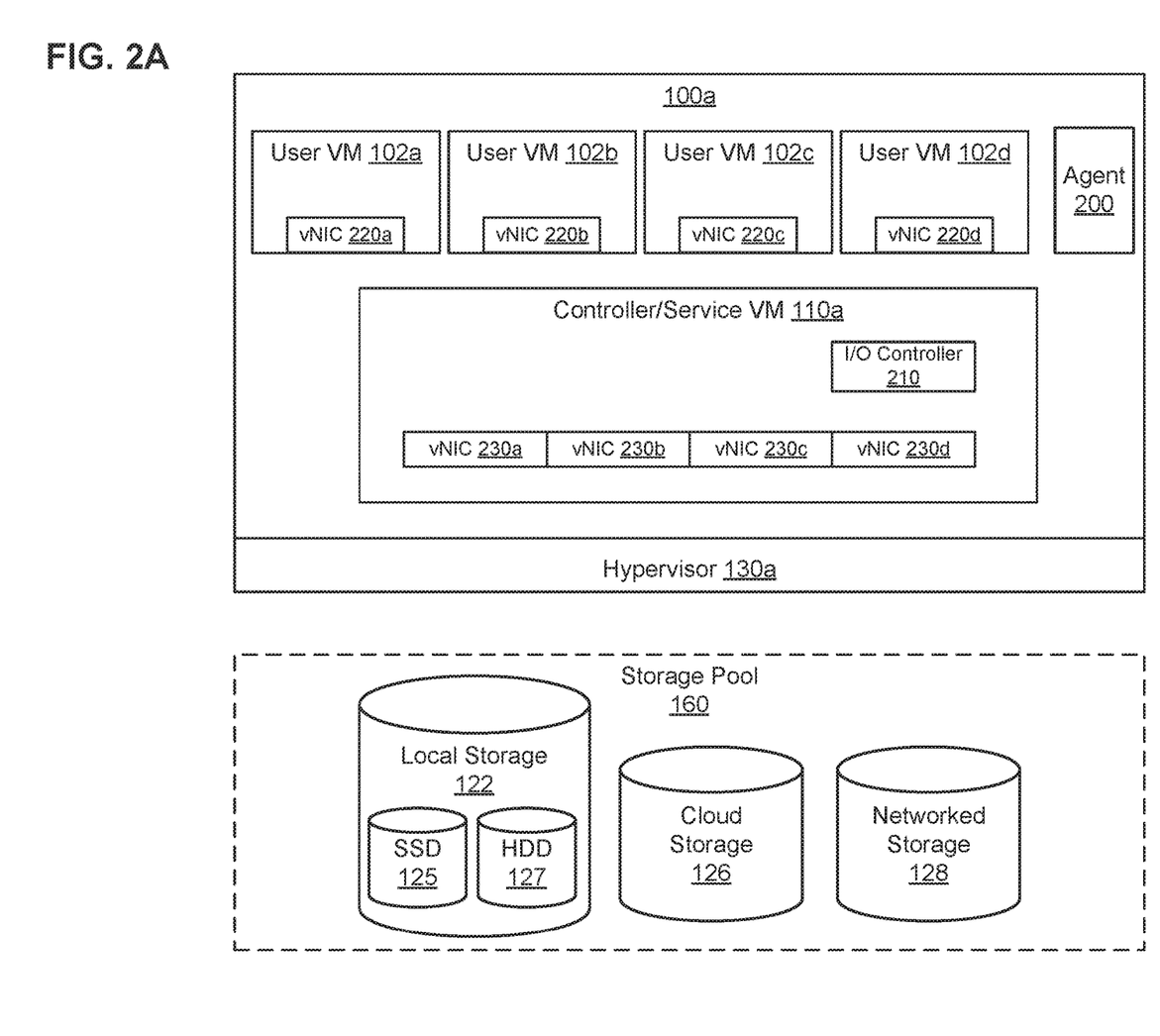
FIGS. 2A-2D illustrate an example node of an example clustered system implementing a virtualization environment with hypervisor conversion capabilities according to some embodiments of the invention.

FIGS. 2A-2D illustrate an example node of an example clustered system implementing a virtualization environment with hypervisor conversion capabilities according to some embodiments of the invention. FIG. 2A illustrates the example node with an original hypervisor 130a, which may later be converted. In particular embodiments, a captured configuration may comprise information describing elements of a virtual infrastructure associated with the original hypervisor 130a; in particular embodiments, the captured configuration information may be stored in the storage pool 160. A Controller/Service VM 110a may have one or more I/O controllers 210 for handling data transmissions. Each User VM 102 may have a connection agent 200 for monitoring the status of I/O controllers 210 and directing I/O requests to an available I/O controller 210 at a Controller/Service VM 110a. In particular embodiments, such I/O requests may be sent using a protocol to facilitate data transfers over intranets and to manage storage over long distances, such as, by way of example and not limitation, a transport protocol (e.g., Internet Small Computer System Interface ("iSCSI") protocol over Transmission Control Protocol (TCP)) or a distributed file system protocol (e.g., Network File System (NFS) over User Datagram Protocol (UDP)). Particular embodiments may use any Internet Protocol (IP)-based storage networking standard for linking data storage facilities and transmitting data over local area networks (LANs), wide area networks (WANs), or the Internet. Particular embodiments may also enable location-independent data storage and retrieval. The I/O controllers 210 may be elements of one or more virtual infrastructures associated with the hypervisor 130a. In particular embodiments, a captured configuration including I/O controllers 210 may comprise a count of I/O controllers 210 exposed to a particular user VM 102, identification information of each I/O controller 210, availability information of each I/O controller 210 (e.g., a history of echo requests and responses associated with the I/O controller 210), and configuration settings for each I/O controller 210 (e.g., protocols used by the I/O controller 210, average response time of the I/O controller 210).

The Controller/Service VM 110a may have one or more virtual network interface cards (vNICs) 230. One or more of the vNICs 230 of the Controller/Service VM 110a may be bridged to a physical network interface card that is implemented on the physical host machine 100a and be used to handle communications with a network external to the physical host machine 100a, such as the network 140. Alternatively, one or more of the vNICs 230 of the Controller/Service VM 110a may correspond to an internal virtual LAN that permits the user VMs 102 to communicate with the Controller/Service VM 110a. Each user VM 102 may have one or more vNICs 220. The vNICs 220 may interface the user VMs 102 with a virtual network created by the Controller/Service VM 110a. In particular, the vNICs 220 may connect the user VMs 102 with storage pool 160. The vNICs 220 may appear to each user VM 102 as a full-fledged PCI Ethernet controller, complete with its own media access control ("MAC") address. They may appear to have one or more ports, each port may be assigned a unique IP address or a common IP address shared with other ports on a virtual network. The vNICs 220 may further appear to handle transmission of I/O requests and data packets using a particular protocol, such as a transport protocol (e.g., iSCSI, TCP) or a distributed file system protocol (e.g., NFS, UDP). The vNICs 220 and 230 may be elements of one or more virtual infrastructures associated with the hypervisor 130a. In particular embodiments, a captured configuration including vNICs 220 may comprise a count of vNICs 220 exposed to a particular user VM 102, identification information of each vNIC 220 (e.g. a MAC address and an IP address associated with the vNIC 220), network configuration settings for each vNIC 220 (e.g., the type of the network, the bandwidth of the network, available ports, protocols of the network), and network configuration information.

In addition to the I/O controllers 210 and vNICs 220 and 230, the elements of the virtual infrastructures may also comprise one or more processors, one or more memory elements, and one or more storage devices in the vDisks. A captured configuration including processors may comprise a count of processors available to a particular user VM 102, identification information of each available processor (e.g., the location of a physical component corresponding to the processor on the network 140, a serial number associated with the processor), and configuration settings for each available processor, such as, by way of example and not limitation, a type of the processor (e.g., CPU vs. GPU, RISC vs. x86 architecture), a number of cores for the processor, a processor frequency, a size of a cache associated with the processor). A captured configuration including memory elements may comprise a count of memory elements available to a particular user VM 102, identification information of each memory element, and configuration settings for each memory element (e.g., a type of the memory, a size of the memory, a speed of the memory). A captured configuration including storage devices in the vDisks may comprise identification information of each storage device and access information of each storage device (e.g., a network location, a type of storage device, ports used by the storage device, protocols required to access the storage device, authorization information, authentication information, encryption information).

A management module 240 may be implemented on the physical host machine 100a as a low-level continuously-running thread. An administrator of the virtualization environment may be authorized to control the management module 240 (which is running on the leader node 100b) through a LAN, WAN, or internet connection. In particular embodiments, the management module 240 may be operable to install or uninstall the hypervisor 130a on the physical host machine 100a. The management module 240 may further be operable to enable or disable the hypervisor 130a installed on the physical host machine 100a. The management module 240 may have access to the storage pool 160 through one or more I/O controllers 210. In particular embodiments, the management module 240 may be operable to capture a configuration comprising information describing elements of a virtual infrastructure associated with the hypervisor 130a. The management module 240 may be operable to store the captured configuration information in a memory, cache, or the storage pool 160. It may be operable to access, edit, duplicate, and remove configuration files stored in the storage pool 160, which comprise configuration information describing elements of one or more virtual infrastructures exposed to one or more user VMs 102.

Figure 2B:
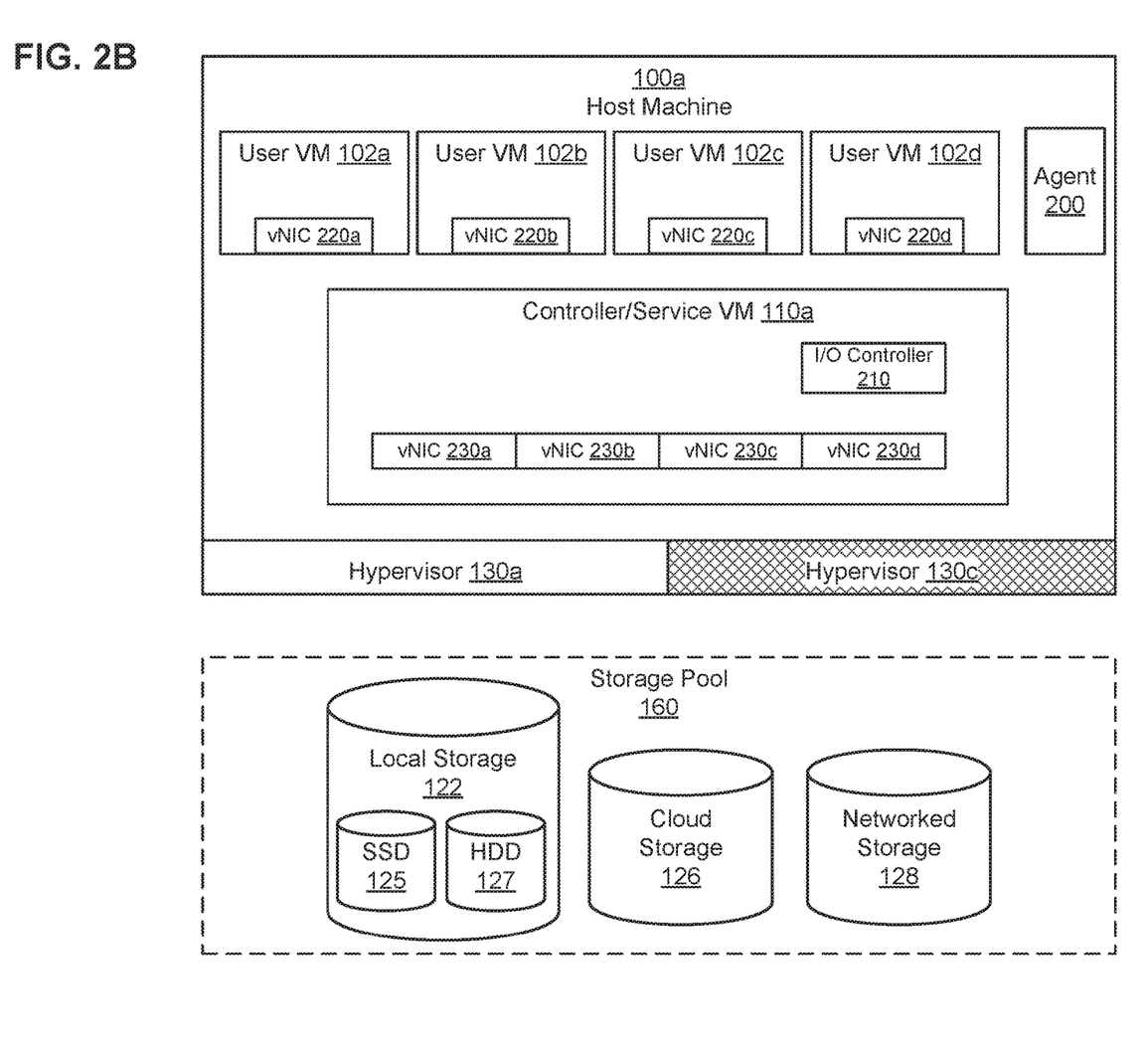
Figure 2C:
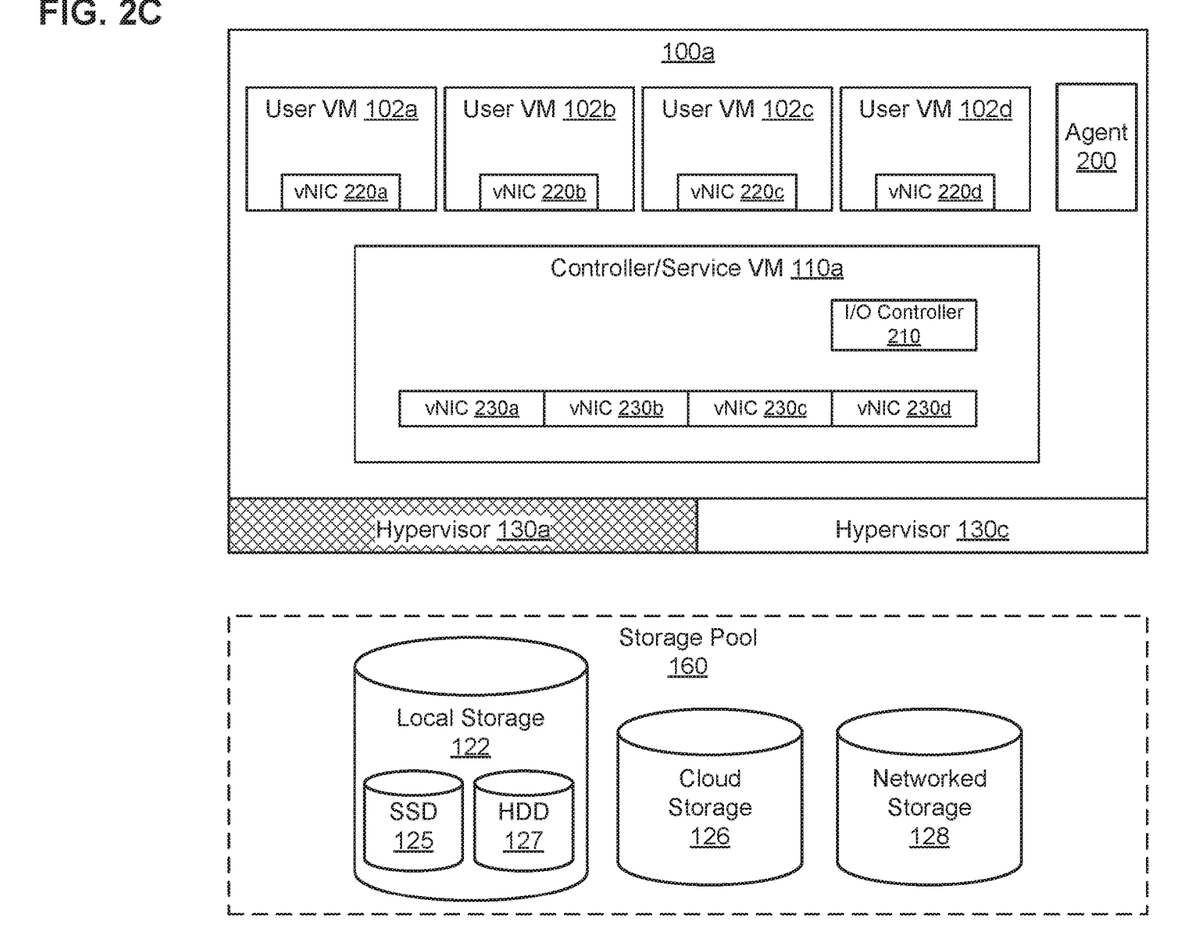
Figure 2D:
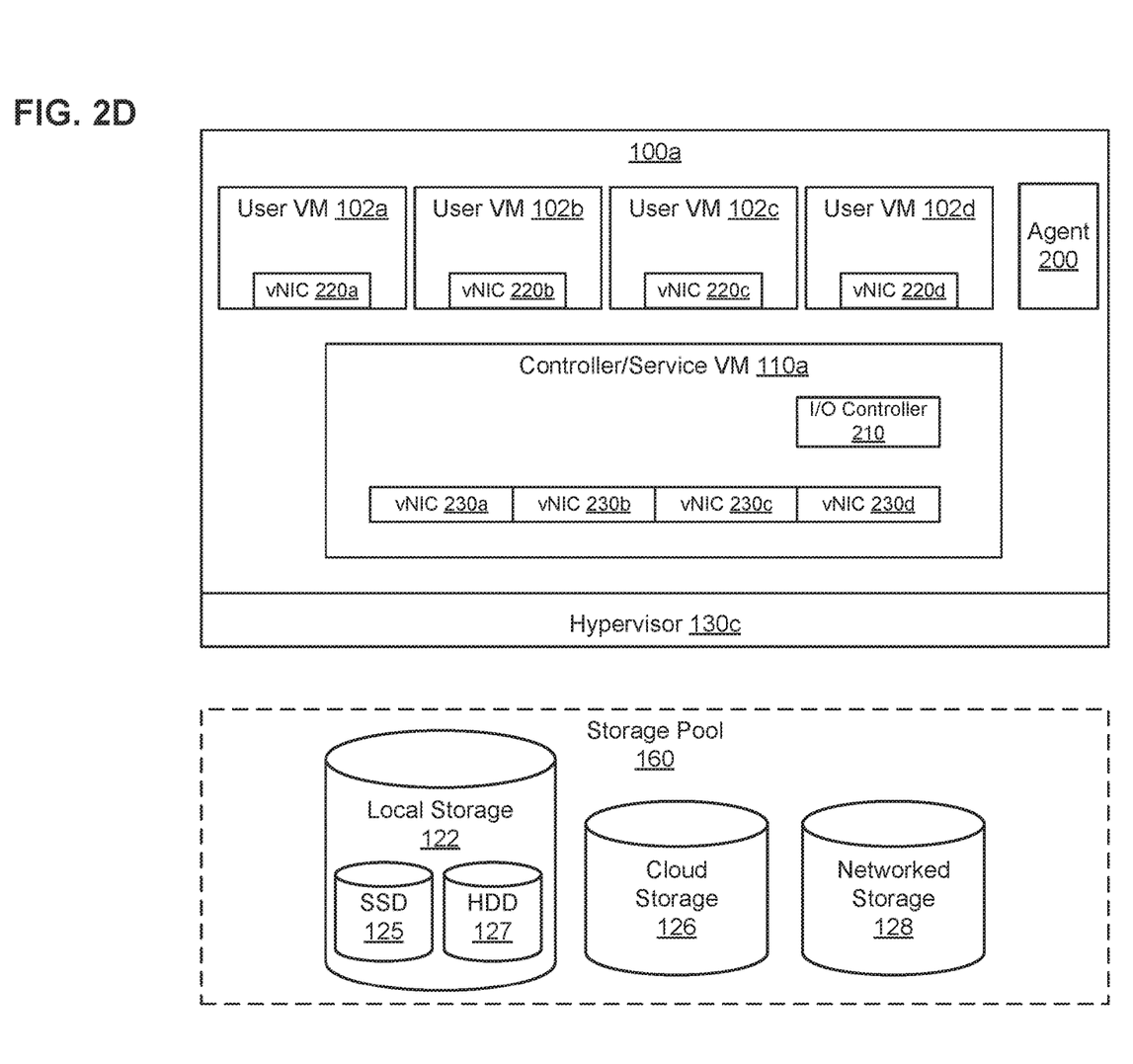

In particular embodiments, the management module 240 may be operable to convert an original virtualization environment implemented on the physical host machine 100a to a new virtualization environment. The conversion of virtualization environments may require converting the original hypervisor 130a to a new hypervisor. As illustrated by FIG. 2B, the management module 240 may install a new hypervisor 130c on the physical host machine 100a. By installing the new hypervisor 130c, the old hypervisor 130a may be wiped out, and upon reboot, new hypervisor 130c may become active. As illustrated by FIG. 2C, the management module 240 may then enable the new hypervisor 130c, to manage the user VMs 102. The new hypervisor 130c may be enabled after the management module 240 registers the captured configuration with the new hypervisor 130c and creates elements of the captured configuration in the context of a platform associated with the new hypervisor 130c. Finally, as illustrated by FIG. 2D, the management module 240 may uninstall the original hypervisor 130a to complete conversion over to the new hypervisor 130c. The management module 240 may alternatively leave the original hypervisor 130a on the physical host machine 100a, being inactive.

Figure 3:
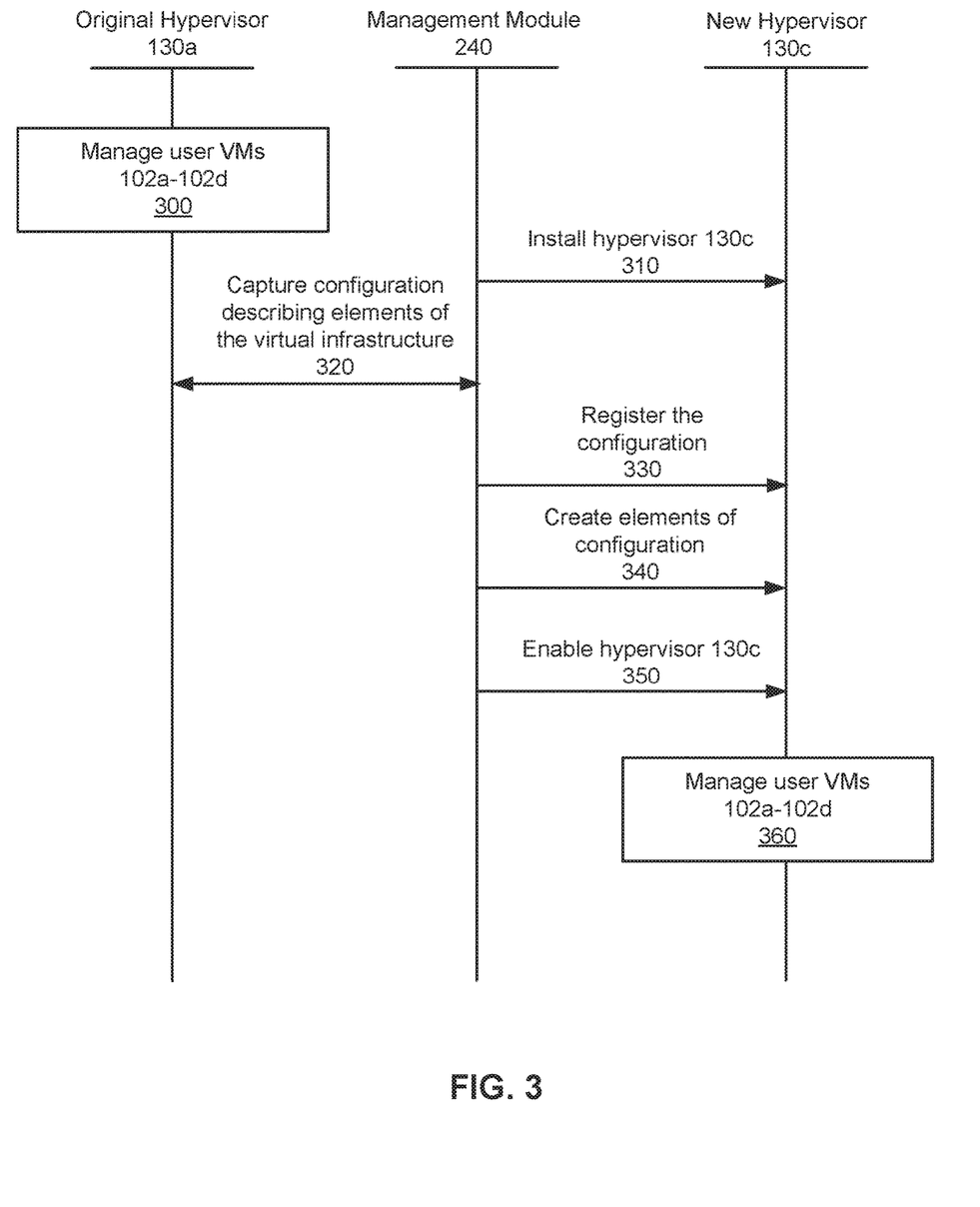
FIG. 3 illustrates an example method for converting a hypervisor implemented on a physical host machine according to some embodiments of the invention.

FIG. 3 illustrates an example method for converting a hypervisor implemented on a physical host machine according to some embodiments of the invention. At step 300, an original hypervisor 130a may be managing the user VMs 102a-102d implemented on the physical host machine 100a. The original hypervisor 130a may be part of a virtualization environment based on a first platform. The first platform may be developed by a particular virtualization vendor or correspond to a particular generation of virtual machine technology. The hypervisor 130a may monitor the activities of the user VMs 102a-102d and allocate hardware resources among them. In particular embodiments, the hypervisor 130a may be operable to manage the operations of the Controller/Service VM 110a.

At step 310, the management module 240 may install a new hypervisor 130c, on the physical host machine 100a. The new hypervisor 130c may be associated with a second platform that is different from the first platform. In particular embodiments, the second platform may be developed by a different virtualization vendor. The second platform may correspond to a newer generation of technology than the first platform. In particular embodiments, the new hypervisor 130c may be installed on an element of local storage 122 of the physical host machine 100a. In particular embodiments, the new hypervisor 130c may be installed while the original hypervisor 130a continues running.

At step 320, the management module 240 may capture a configuration comprising information describing elements of a virtual infrastructure associated with the original hypervisor 130a. The captured configuration may comprise information of one or more of vNICs 220 and 230, one or more I/O controllers 210, processors, memory elements, or storage devices. It may be associated with one or more of the user VMs 102a-102d or the Controller/Service VM 110a, which may be or used to be managed by the original hypervisor 130a. The captured configuration may be stored in a memory element, cache, or in a file stored in storage pool 160. The captured configuration may alternatively be stored in one or more vDisks. In particular embodiments, the management module 240 may capture the configuration by monitoring the operations of the hypervisor 130a, the Controller/Service VM 110a, and the user VMs 102. In particular embodiments, the management module 240 may capture the configuration by accessing one or more configuration files for hypervisor 130a.

At step 330, the management module 240 may register the captured configuration with the new hypervisor 130c. In particular embodiments, the management module 240 may extract information from one or more configuration files associated with the original hypervisor 130a in order to make the information available to the new hypervisor 130c. For example, the management module 240 may provide to the new hypervisor 130c configuration files comprising captured configuration information in the storage pool 160.

At step 340, the management module 240 may create elements of the captured configuration in the context of the second platform and in association with the new hypervisor 130c. In particular embodiments, the management module 240 may create the elements of the captured configuration by re-registering each of the user VMs 102 into the new hypervisor 130c. In particular embodiments, one or more newly-created elements may be different from the original elements based on one or more features or characteristics of the second platform.

At step 350, the management module 240 may enable the new hypervisor 130c. At step 360, after the new hypervisor 130c has been enabled, it may manage the user VMs 102a-102d and create one or more new user VMs implemented on the physical host machine 100a. Since the Controller/Service VM 110a runs independently of the hypervisors 130 and all data maintained within the Controller/Service VM 110a remains unchanged, it may be used in conjunction with any hypervisor from any virtualization vendor. Therefore, under the current approach, it may not be necessary to terminate or modify the Controller/Service VM 110a to accommodate the new hypervisor 130c. This ensures undisrupted access by the re-registered user VMs 102 to the storage pool 160. The user VMs 102 may be available and responsive to requests during the entire hypervisor conversion process.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for converting a hypervisor implemented on a physical host machine including the particular steps of the method of FIG. 3, this disclosure contemplates any suitable method for converting a hypervisor implemented on a physical host machine including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
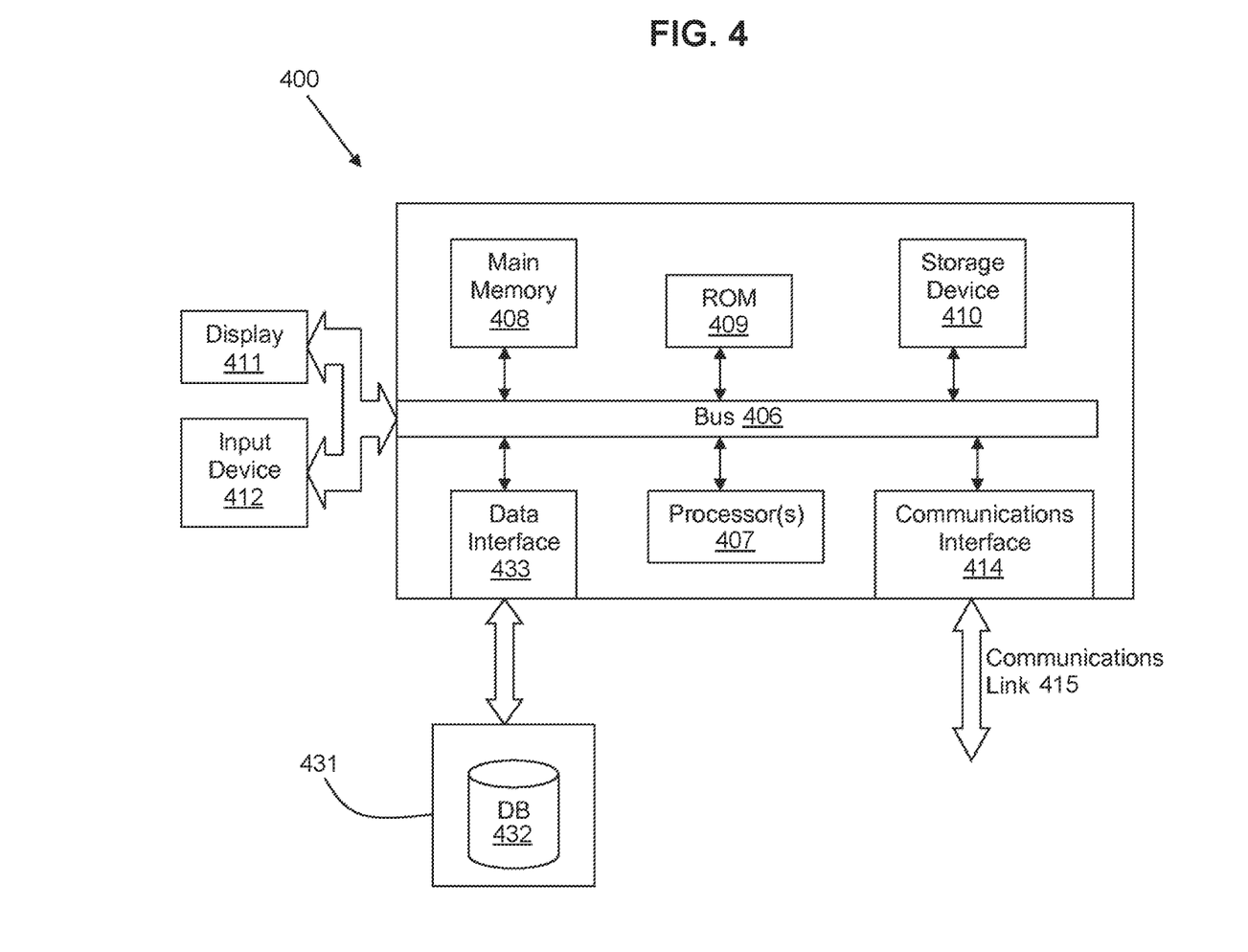
FIG. 4 illustrates a block diagram of a computing system suitable for implementing an embodiment of the present invention.

FIG. 4 is a block diagram of an illustrative computing system 400 suitable for implementing an embodiment of the present invention. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

Computer system 400 includes a bus 406 (e.g., an address bus and a data bus) or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), display 411 (e.g., CRT, LCD, LED), input device 412 (e.g., keyboard, keypad, mouse, microphone). In particular embodiments, computer system 400 may include one or more of any such components.

According to one embodiment of the invention, computer system 400 performs specific operations by processor 407 executing one or more sequences of one or more instructions contained in system memory 408. Such instructions may be read into system memory 408 from another computer readable/usable medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 407 for execution. Such a medium may take many forms, including but not limited to, nonvolatile media and volatile media. Non-volatile media includes, for example, optical or magnetic disks, such as disk drive 410. Volatile media includes dynamic memory, such as system memory 408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PSTN, or wireless network) may perform the sequence of instructions required to practice the invention in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. A database 432 in a storage medium 431 may be used to store data accessible by the system 400 using data interface 433.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
   a host machine configured to implement a virtualization environment, wherein the host machine comprises a first hypervisor and a virtual machine (VM) managed by the first hypervisor; and
   a controller VM configured to perform a hypervisor conversion process including:
      installing, on the host machine, a second hypervisor independent from the first hypervisor;
      capturing a configuration describing elements of a virtual infrastructure associated with the first hypervisor;
      registering the captured configuration with the second hypervisor;
      creating elements of the captured configuration usable by the second hypervisor; and
      enabling the second hypervisor and disabling the first hypervisor,
      such that management of the VM is transferred directly from the first hypervisor to the second hypervisor, and the VM on the host machine remains available and responsive to requests during the hypervisor conversion process.

2. The system of claim 1, wherein the host machine comprises one or more virtual infrastructure elements comprising one or more virtual network interface cards (vNICs), wherein one of the one or more vNICs corresponds to the VM, and wherein the captured configuration comprises identification information and network configuration settings for each of the one or more vNICs and virtual network configuration information.

3. The system of claim 1, wherein the host machine comprises one or more virtual infrastructure elements comprising one or more processors, and wherein the captured configuration comprises identification information and configuration settings for each of the one or more processors.

4. The system of claim 1, wherein the host machine comprises one or more virtual infrastructure elements comprising one or more memory elements, and wherein the captured configuration comprises identification information and configuration settings for each of the one or more memory elements.

5. The system of claim 1, wherein the captured configuration comprises identification information and access information for one or more storage devices in a virtual disk.

6. The system of claim 1, wherein the creating elements of the captured configuration comprises reimaging the VM into the second hypervisor as a user virtual machine (UVM).

7. The system of claim 1, wherein the created elements are different from the elements of the virtual infrastructure associated with the first hypervisor.

8. The system of claim 1, wherein the first hypervisor manages the VM by mediating interactions between underlying hardware of the host machine and the VM, wherein enabling the second hypervisor comprises transferring management of the VM such that the second hypervisor mediates interactions between underlying hardware of the host machine and the VM.

9. The system of claim 1, wherein the host machine comprises a plurality of virtual machines, including the VM, and wherein enabling the second hypervisor and disabling the first hypervisor occurs such that management of the plurality of VMs is transferred directly from the first hypervisor to the second hypervisor.

10. One or more computer-readable non-transitory storage media, the media encoded with instructions for implementing a hypervisor conversion process comprising:
    on a host machine implementing a virtualization environment operating with a first hypervisor, installing a second hypervisor independent from the first hypervisor;
    capturing a configuration describing elements of a virtual infrastructure associated with the first hypervisor;
    registering the captured configuration with the second hypervisor;
    creating elements of the captured configuration usable by the second hypervisor; and
    enabling the second hypervisor and disabling the first hypervisor such that management of a virtual machine (VM) running on the host machine is transferred directly from the first hypervisor to the second hypervisor, and the VM remains available and responsive to requests during the hypervisor conversion process.

11. The media of claim 10, wherein the host machine comprises the first hypervisor, the VM, one or more virtual infrastructure elements, and a controller VM.

12. The media of claim 11, wherein the one or more virtual infrastructure elements comprises one or more vNICs including a vNIC corresponding to the VM, and wherein the captured configuration comprises identification information and network configuration settings for each of the one or more vNICs and virtual network configuration information.

13. The media of claim 11, wherein the one or more virtual infrastructure elements comprises one or more processors, and wherein the captured configuration comprises identification information and configuration settings for each of the one or more processors.

14. The media of claim 11, wherein the one or more virtual infrastructure elements comprises one or more memory elements, and wherein the captured configuration comprises identification information and configuration settings for each of the one or more memory elements.

15. The media of claim 10, wherein the captured configuration comprises identification information and access information for each of a plurality of storage devices are stored in a virtual disk.

16. The media of claim 10, wherein the creating elements of the captured configuration comprises reimaging the VM into the second hypervisor as a user virtual machine (UVM).

17. The media of claim 10, wherein the created elements are different from the elements of the virtual infrastructure associated with the first hypervisor.

18. The media of claim 10, wherein the first hypervisor manages the VM by mediating interactions between underlying hardware of the host machine and the VM, wherein enabling the second hypervisor comprises transferring management of the VM such that the second hypervisor mediates interactions between underlying hardware of the host machine and the VM.

19. The storage media of claim 10, wherein enabling the second hypervisor and disabling the first hypervisor occurs such that management of a plurality of VMs, including the VM, is transferred directly from the first hypervisor to the second hypervisor.

20. A method for converting a host machine implementing a virtualization environment comprises a hypervisor conversion process, the hypervisor conversion operable to perform operations comprising:
- on the host machine operating with a first hypervisor and a virtual machine (VM), installing a second hypervisor independent from the first hypervisor;
- capturing a configuration describing one or more virtual infrastructure elements associated with the first hypervisor;
- registering the captured configuration with the second hypervisor;
- creating elements of the captured configuration usable by the second hypervisor; and
- enabling the second hypervisor and disabling the first hypervisor such that management of the VM running on the host machine is transferred directly from the first hypervisor to the second hypervisor and the VM running on the host machine remains available and responsive to requests during the hypervisor conversion process.

21. The method of claim 20, wherein the one or more virtual infrastructure elements comprises one or more vNICs, wherein the one or more vNICs correspond to the VM running on the host machine, and wherein the captured configuration comprises identification information and network configuration settings for each of the one or more vNICs and virtual network configuration information.

22. The method of claim 20, wherein the one or more virtual infrastructure elements comprises one or more processors, and wherein the captured configuration comprises identification information and configuration settings for each of the one or more processors.

23. The method of claim 20, wherein the one or more virtual infrastructure elements comprises one or more memory elements, and wherein the captured configuration comprises identification information and configuration settings for each of the one or more memory elements.

24. The method of claim 20, wherein the captured configuration comprises identification information and access information for each of the storage devices is stored in a virtual disk.

25. The method of claim 20, wherein the created elements are different from the one or more virtual infrastructure elements associated with the first hypervisor.

26. The method of claim 20, wherein the first hypervisor manages the VM by mediating interactions between underlying hardware of the host machine and the VM, wherein enabling the second hypervisor comprises transferring management of the VM such that the second hypervisor mediates interactions between underlying hardware of the host machine and the VM.

27. The method of claim 20, wherein enabling the second hypervisor and disabling the first hypervisor occurs such that management of a plurality of VMs running on the host machine, including the VM, is transferred directly from the first hypervisor to the second hypervisor, and the plurality of VMs remain available and responsive to requests during the hypervisor conversion process.

* * * * *